US009019289B2

(12) United States Patent
Bourd

(10) Patent No.: US 9,019,289 B2
(45) Date of Patent: Apr. 28, 2015

(54) EXECUTION OF GRAPHICS AND NON-GRAPHICS APPLICATIONS ON A GRAPHICS PROCESSING UNIT

(75) Inventor: Alexei V. Bourd, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 152 days.

(21) Appl. No.: 13/414,450

(22) Filed: Mar. 7, 2012

(65) Prior Publication Data
US 2013/0235053 A1 Sep. 12, 2013

(51) Int. Cl.
*G06T 1/20* (2006.01)
*G06F 9/50* (2006.01)

(52) U.S. Cl.
CPC ............. *G06T 1/20* (2013.01); *G06F 9/5094* (2013.01); *G06F 9/5044* (2013.01)

(58) Field of Classification Search
None
See application file for complete search history.

(56) References Cited

U.S. PATENT DOCUMENTS

| 8,310,492 | B2* | 11/2012 | McCrary et al. ............... 345/522 |
|---|---|---|---|
| 2007/0204268 | A1 | 8/2007 | Drepper |
| 2009/0141033 | A1 | 6/2009 | Street |
| 2009/0305790 | A1* | 12/2009 | Lu et al. .......................... 463/42 |
| 2010/0184518 | A1 | 7/2010 | Sylla |
| 2010/0265250 | A1 | 10/2010 | Koenig et al. |
| 2010/0287556 | A1 | 11/2010 | Munz |
| 2011/0050716 | A1 | 3/2011 | Mantor et al. |
| 2011/0063306 | A1* | 3/2011 | Diard ............................ 345/503 |
| 2011/0212761 | A1 | 9/2011 | Paulsen et al. |
| 2012/0013627 | A1* | 1/2012 | Shah et al. .................... 345/522 |
| 2012/0229481 | A1* | 9/2012 | McCrary et al. ............... 345/522 |
| 2013/0141447 | A1* | 6/2013 | Hartog et al. .................. 345/522 |

FOREIGN PATENT DOCUMENTS

| EP | 2068279 A1 | 6/2009 |
|---|---|---|
| WO | WO2011023204 A1 | 3/2011 |

OTHER PUBLICATIONS

OpenCL Extension (cl_ext_device_fission, http://www.khronos.org/registry/cl/extensions/ext/cl_ext_device_fission.txt, Jun. 9, 2010).*
International Search Report and Written Opinion—PCT/US2013/026596—ISA/EPO—Jun. 10, 2013, 11 pp.
Kato et al., "Resource Sharing in GPU-Accelerated Windowing Systems", Real-Time and Embedded Technology and Applications Symposium (RTAS), 2011 17th IEEE, IEEE, Apr. 11, 2011, pp. 191-200, 10 pp.

(Continued)

*Primary Examiner* — Tize Ma
*Assistant Examiner* — Yu Chen
(74) *Attorney, Agent, or Firm* — Shumaker & Sieffert, P.A.

(57) ABSTRACT

The techniques described in this disclosure are directed to efficient parallel execution of graphics and non-graphics application on a graphics processing unit (GPU). The GPU may include a plurality of shader cores within a shader processor. The techniques may reserve one or more shader cores to execute the graphics application and reserve one or more other shader cores to execute the non-graphics application. In this manner, the execution of the non-graphics application may not interfere with the execution of the graphics application, and vice-versa.

34 Claims, 6 Drawing Sheets

(56) References Cited

OTHER PUBLICATIONS

Li et al., "A Static Task Scheduling Framework for Independent Tasks Accelerated Using a Shared Graphics Processing Unit", Parallel and Distributed Systems (ICPADS), 2011 IEEE 17th International Conference on, IEEE, Dec. 7, 2011, pp. 88-95, 8 pp.

Neumann et al., "Intel Virtualization Technology in Embedded and Communications Infrastructure Applications", Intel Technology Journal, vol. 10, No. 03, Aug. 10, 2006, pp. 217-226, 12 pp.
International Preliminary Report on Patentability from international application No. PCT PCT/US2013/026596, dated Apr. 8, 2014, 8 pp.

* cited by examiner

EXECUTION OF GRAPHICS AND NON-GRAPHICS APPLICATIONS ON A GRAPHICS PROCESSING UNIT

TECHNICAL FIELD

This disclosure is directed to applications that execute on a graphics processing unit (GPU), and more particularly, to the manner in which the GPU executes such applications.

BACKGROUND

Graphics processing units (GPUs) were traditionally limited to performing only graphics related processing in fixed-function pipelines that provided very limited functional flexibility. Newer GPUs include programmable cores that execute programs, and thereby provide greater functional flexibility as compared to the traditional GPUs. The programmable cores may execute both graphics applications and non-graphics applications, permitting so-called general purpose GPU (GPGPU) applications.

SUMMARY

In general, this disclosure is related to techniques for parallel execution of graphics applications and non-graphics applications on a graphics processing unit (GPU). The GPU may include a plurality of shader cores that are capable of executing one or more graphics applications and one or more non-graphics applications. The techniques described in this disclosure may selectively reserve a first set of the shader cores for the graphics applications, and a second set of the shader cores for the non-graphics applications. The techniques may also delineate between the instructions for a graphics application and the instructions for the non-graphics application. In this manner, graphics applications executing on the first set of shader cores may not interfere with the execution of non-graphics applications executing on the second set of shader cores, and vice-versa. Such delineated execution may promote efficient execution of graphics and non-graphics applications at the same time (i.e., in parallel) on the GPU.

In one example, the disclosure describes a method that includes receiving, with a graphics processing unit (GPU), an indication of a first set of shader cores of a shader processor of the GPU that are reserved for a graphics application, and receiving, with the GPU, an indication of a second, different set of shader cores of the shader processor of the GPU that are reserved for a non-graphics application. The method further includes receiving, with the GPU, instructions of the graphics application, and receiving, with the GPU, instructions of the non-graphics application. The method also includes executing, with the GPU, the instructions of the graphics application with the first set of shader cores, and at a substantially same time as executing the instructions of the graphics application, executing, with the GPU, the instructions of the non-graphics application with the second set of shader cores.

In another example, the disclosure describes a method that includes determining, with a driver on a processor, a first set of shader cores of a shader processor of a graphics processing unit (GPU) that are reserved for a graphics application to be executed on the first set of shader cores, and determining, with the driver on the processor, a second, different set of shader cores of the shader processor of the GPU that are reserved for a non-graphics application to be executed by the second set of shader cores. The method also includes transmitting to the GPU an indication of the first set of shader cores and an indication of the second set of shader cores.

In another example, the disclosure describes a graphics processing unit (GPU) that includes a shader processor that includes a plurality of shader cores. The GPU also includes a first command processor configured to receive an indication of a first set of the shader cores that are reserved for executing instructions of a graphics application, and receive the instructions of the graphics application. The GPU also includes a second command processor configured to receive an indication of a second, different set of the shader cores that are reserved for executing instructions of a non-graphics application, and receive the instructions of the non-graphics application.

In another example, the disclosure describes a processor that is configured to determine a first set of shader cores of a shader processor of a graphics processing unit (GPU) that are reserved for a graphics application to be executed on the first set of the shader cores, and determine a second, different set of shader cores of the shader processor of the GPU that are reserved for a non-graphics application to be executed by the second set of shader cores. The processor is also configured to transmit to the GPU an indication of the first set of shader cores and an indication of the second set of shader cores.

In another example, the disclosure describes a GPU that includes a first means for receiving an indication of a first set of shader cores of a shader processor of the GPU that are reserved for a graphics application, and a second means for receiving an indication of a second, different set of shader cores of the shader processor of the GPU that are reserved for a non-graphics application. The GPU also comprises a third means for receiving instructions of the graphics application, and a fourth means for receiving instructions of the non-graphics application. The GPU further comprises means for executing the instructions of the graphics application with the first set of shader cores, and at a same time as executing the instructions of the graphics application, means for executing the instructions of the non-graphics application with the second set of shader cores.

In another example, the disclosure describes a computer-readable storage medium comprising instructions that cause one or more processors to receive, with a graphics processing unit (GPU), an indication of a first set of shader cores of a shader processor of the GPU that are reserved for a graphics application, and receive, with the GPU, an indication of a second, different set of shader cores of the shader processor of the GPU that are reserved for a non-graphics application. The instructions also cause the one or more processors to receive, with the GPU, instructions of the graphics application, and receive, with the GPU, instructions of the non-graphics application. The instructions also cause the one or more processors to execute, with the GPU, the instructions of the graphics application with the first set of shader cores, and at a same time as executing the instructions of the graphics application, execute, with the GPU, the instructions of the non-graphics application with the second set of shader cores.

In another example, the disclosure describes a processor that includes means for determining a first set of shader cores of a shader processor of a graphics processing unit (GPU) that are reserved for a graphics application to be executed on the first set of shader cores, and means for determining a second, different set of shader cores of the shader processor of the GPU that are reserved for a non-graphics application to be executed by the second set of shader cores. The processor also includes means for transmitting to the GPU an indication of the first set of shader cores and an indication of the second set of shader cores.

In another example, the disclosure describes a computer-readable storage medium comprising instructions that cause one or more processors to determine, with a driver on the one or more processors, a first set of shader cores of a shader processor of a graphics processing unit (GPU) that are reserved for a graphics application to be executed on the first set of shader cores, and to determine, with the driver on the one or more processors, a second, different set of shader cores of the shader processor of the GPU that are reserved for a non-graphics application to be executed by the second set of shader cores. The instructions also cause the one or more processors to transmit to the GPU an indication of the first set of shader cores and an indication of the second set of shader cores.

In another example, the disclosure describes an apparatus that includes a processor and a graphics processing unit (GPU). The processor is configured to determine a first set of shader cores of a shader processor of the GPU that are reserved for a graphics application to be executed on the first set of the shader cores, determine a second, different set of shader cores of the shader processor of the GPU that are reserved for a non-graphics application to be executed by the second set of shader cores, and transmit to the GPU an indication of the first set of shader cores and an indication of the second set of shader cores. The GPU includes the shader processor that includes a plurality of shader cores that include the first set of shader cores and the second set of shader cores, a first command processor configured to receive the indication of the first set of the shader cores that are reserved for executing instructions of the graphics application, and receive the instructions of the graphics application, and a second command processor configured to receive the indication of the second, different set of the shader cores that are reserved for executing instructions of the non-graphics application, and receive the instructions of the non-graphics application.

The details of one or more aspects of the disclosure are set forth in the accompanying drawings and the description below. Other features, objects, and advantages of the disclosure will be apparent from the description and drawings, and from the claims.

DETAILED DESCRIPTION

A graphics processing unit (GPU) includes a command processor, fixed-function graphics processing hardware units, and one or more shader cores that form a shader processor. Conventionally, the one or more shader cores of the shader processor executed programs that were limited to performing functions on graphics data. For example, the one or more shader cores would execute vertex shaders and fragment shaders, and, conventionally would not execute non-graphics applications.

However, the massive parallel computational efficiency supported by the GPU may benefit a non-graphics related application. For example, newer GPUs provide general processing functionality, and may be referred to as general purpose GPUs (GPGPUs). The shader cores of these GPGPUs may execute graphics applications as well as non-graphics applications.

Because a graphics application and a non-graphics application both execute on one or more shader cores of the GPGPU, the execution of the non-graphics application may potentially interfere with the execution of the graphics application. For example, assume that the shader cores of the GPGPU are executing a non-graphics application and a graphics application that generates the user interface for the device. In this example, it may be possible that the execution of the non-graphics application interferes with the generation of the user interface. This interference may cause the user interface to become non-responsive which may potentially degrade the user experience.

As described in more detail below, this disclosure describes techniques with which one or more shader cores of a shader processor of a single GPGPU may execute a graphics application and a non-graphics application without the non-graphics application interfering with the performance of the graphics application, and vice-versa. For instance, one or more shader cores of the shader processor may be reserved for graphics applications, and one or more other shader cores of the shader processor may be reserved for non-graphics application. The reservation of the shader cores may occur statically or dynamically. For example, the reservation of the shader cores may be predetermined. In another example, during execution of the graphics and non-graphics application, the techniques may select how many shader cores should be reserved for graphics applications and how many for non-graphics applications. The techniques may make a single embedded GPU much easier to share between graphics and non-graphics applications, which may allow for a high latency non-graphics application to run without disrupting a low latency graphics application.

Figure 1:
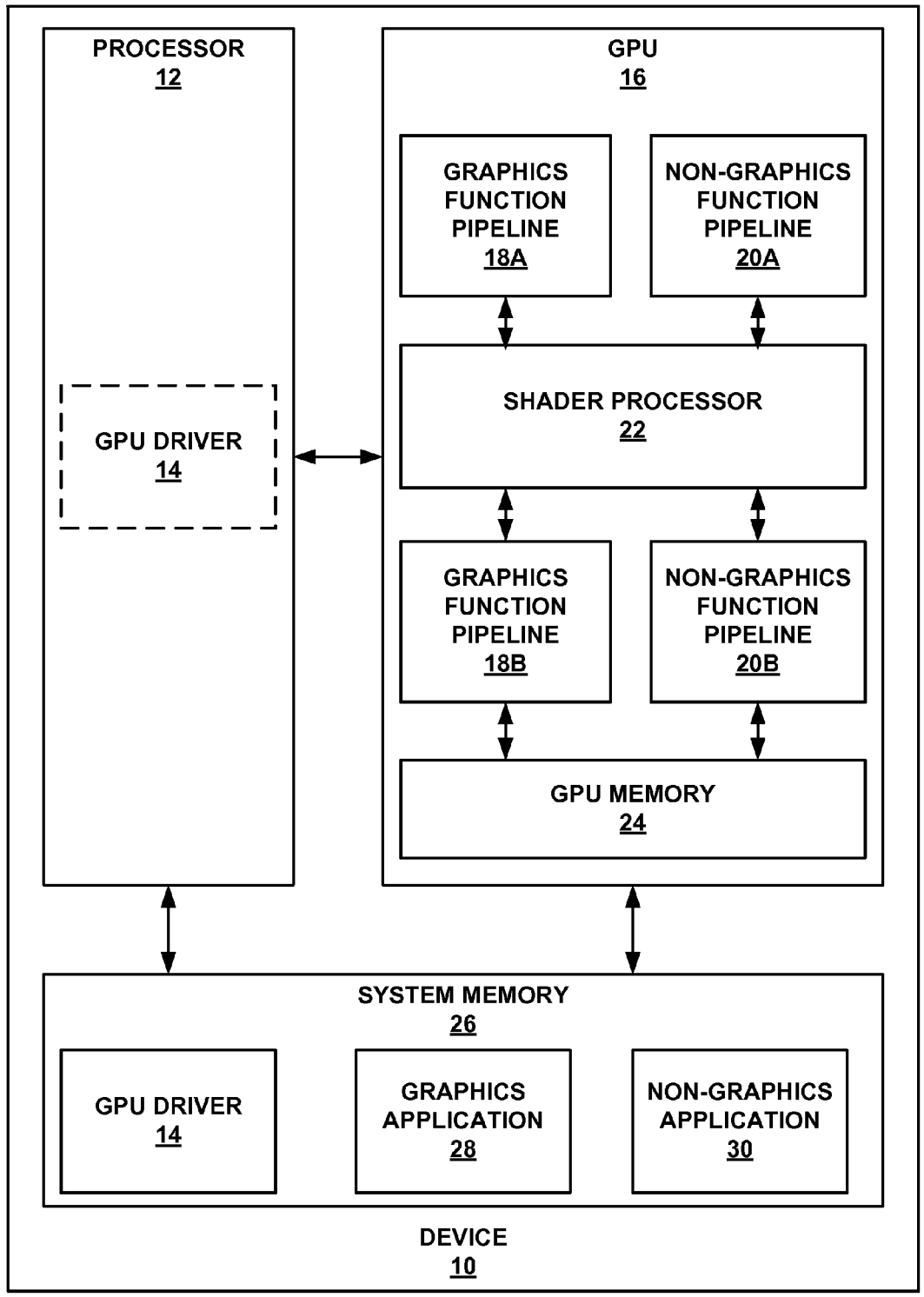
FIG. 1 is a block diagram illustrating a device that may implement one or more example techniques described in this disclosure.

FIG. 1 is a block diagram illustrating a device that may implement one or more example techniques described in this disclosure. FIG. 1 illustrates device 10 that includes processor 12, graphics processing unit (GPU) 16, and system memory 26. Device 10 includes components in addition to those illustrated in FIG. 1, as further illustrated in FIG. 6. Examples of device 10 include, but are not limited to, video devices such as media players, set-top boxes, wireless handsets such as mobile telephones or so-called smartphones, personal digital assistants (PDAs), desktop computers, laptop computers, gaming consoles, video conferencing units, tablet computing devices, and the like.

Processor 12 may be the central processing unit (CPU) of device 10. GPU 16 may be a processing unit configured to perform graphics related functions. For example, GPU 16 may generate and output graphics data for presentation on a display, as well as perform non-graphics related functions that exploit the massive processing parallelism provided by GPU 16. For example, GPU 16 may execute both graphics applications and non-graphics applications, sometimes referred to as compute applications. Because GPU 16 may provide general purpose processing capabilities in addition to graphics processing capabilities, GPU 16 may be referred to as a general purpose GPU (GPGPU).

Examples of processor 12 and GPU 16 include, but are not limited to, any of a variety or general purpose or special purpose processing hardware, such as a digital signal processor (DSP), a general purpose microprocessor, application specific integrated circuit (ASIC), field programmable logic array (FPGA), or other equivalent integrated or discrete logic circuitry. In some examples, GPU 16 may be a microprocessor having multiple processor cores designed for specific usage such as providing massive parallel processing for processing graphics, as well as for executing non-graphics related applications. Furthermore, although processor 12 and GPU 16 are illustrated as separate components, aspects of this disclosure are not so limited. For example, processor 12 and GPU 16 may reside in a common integrated circuit (IC).

System memory 26 is the system memory of device 10 and resides external to processor 12 and GPU 16. For example, system memory 26 may be off-chip relative to processor 12 and GPU 16 and may be accessible via a system bus. As illustrated, system memory 26 may store applications that are executed by processor 12 and GPU 16. For instance, graphics application 28 is a graphics application that GPU 16 executes. Examples of graphics application 28 include vertex shaders and fragment shaders. Non-graphics application 30 is a non-graphics application that GPU 16 executes. An example of non-graphics application 30 is an application that stitches different pictures to create a panoramic picture. For example, the pictures may be picture captured by device 10, and stitched together with GPU 16. GPU driver 14 is another example of an application that system memory 26 stores. Processor 12 may execute GPU driver 14, which may be an application that facilitates communication between processor 12 and GPU 16.

Furthermore, system memory 26 may store data upon which the executed applications operate, as well as the data that results from the application. However, not all such data needs to be stored in system memory 26 in every example. In some instances, the data may be stored locally in memory on processor 12 or GPU 16.

System memory 26 may be an example of a computer-readable storage medium. For example, system memory 26 may store instructions that cause processor 12 and GPU 16 to perform functions ascribed to each in this disclosure. System memory 26 may be considered as a computer-readable storage medium comprising instructions that cause one or more processors, e.g., application processor 12 or GPU 16 to perform various functions.

Examples of system memory 26 include, but are not limited to, a random access memory (RAM), a read only memory (ROM), or an electrically erasable programmable read-only memory (EEPROM), or any other medium that can be used to carry or store desired program code in the form of instructions or data structures and that can be accessed by a computer or a processor. System memory 26 may, in some examples, be considered as a non-transitory storage medium. The term "non-transitory" may indicate that the storage medium is not embodied in a carrier wave or a propagated signal. However, the term "non-transitory" should not be interpreted to mean that system memory 26 is non-movable. As one example, system memory 26 may be removed from device 10, and moved to another device. As another example, a storage device, substantially similar to system memory 26, may be inserted into device 10. In certain examples, a non-transitory storage medium may store data that can, over time, change (e.g., in RAM).

As described above, GPU 16 may execute one or more graphics applications (e.g., graphics application 28) and one or more non-graphics application (e.g., non-graphics application 30) at the same time (i.e., in parallel). However, poor resource management may cause the execution of non-graphics application 30 to interfere with the execution of graphics application 28. In accordance with techniques of this disclosure, GPU 16 may be capable of executing graphics application 28 and non-graphics application 30 at the same time with minimal execution interference.

As illustrated, GPU 16 includes graphics function pipelines 18A and 18B (collectively referred to as graphics function pipeline 18), non-graphics function pipelines 20A and 20B (collectively referred to as non-graphics function pipeline 20), shader processor 22, and GPU memory 24. GPU memory 24 may be on-chip memory for GPU 16. For example, GPU memory 24 may be a cache memory that allows graphics function pipeline 18, non-graphics function pipeline 20, and shader processor 22 to quickly access data.

Graphics function pipeline 18 handles graphics related functions and non-graphics function pipeline 20 handles non-graphics related functions. In this manner, the techniques described in this disclosure delineate resources for graphics related functions from resources for non-graphics related functions. For example, graphics related functions that are processed by graphics function pipeline 18 may not interfere with non-graphics related functions that are processed by non-graphics function pipeline 20, and vice-versa, even when GPU 16 is performing both graphics and non-graphics related functions at the same time. In other words, graphics function pipeline 18 and non-graphics function pipeline 20 may perform respective functions in parallel.

In some examples, graphics function pipeline 18 and non-graphics function pipeline 20 may include fixed function units. Graphics function pipeline 18 and non-graphics function pipeline 20 may, however, share shader processor 22. Shader processor 22 is configured to execute both graphics and non-graphics applications at the same time. For example, shader processor 22 may execute graphics application 28 and, at the same time, execute non-graphics application 30. Although FIG. 1 illustrates only one graphics application and one non-graphics application, aspects of this disclosure are not so limited. In other examples, GPU 16 may execute one or more graphics applications and one or more non-graphics application all at the same time.

To execute graphics application 28 and non-graphics application 30, shader processor 22 includes a plurality of shader cores that execute the instructions of graphics application 28 and non-graphics application 30. For example, the shader cores may execute subsets of the instructions, referred to as workgroups or tasks, of graphics application 28 and non-graphics application 30. These shader cores can be allocated to graphics application 28 or non-graphics application 30.

In the techniques described in this disclosure, GPU driver 14 may reserve a first set of the shader cores within shader processor 22 for executing graphics application 28 and reserve a second set of the shader cores within shader processor 22 for executing non-graphics application 30. As described above, GPU driver 14 may allow processor 12 and GPU 15 to communicate with one another. Reserving of a shader core may refer to allocating that shader core within shader processor 22 to a particular one of graphics application 28 or non-graphics application 30. For example, a shader core that is reserved for graphics application 28 is allocated for executing instructions of graphics application 28, and may not be able to execute instructions of non-graphics application 30 until the shader core is no longer reserved for graphics application 28. Similarly, a shader core that is reserved for non-graphics application 30 may not be usable for executing instructions of graphics application 28 until that shader core is no longer reserved for non-graphics application 30.

As an illustrative example, shader processor 22 may include four shader cores, although more or fewer shader cores are possible. In this example, GPU driver 14 may reserve two of the four shader cores for graphics application 28, and the other two shader cores for non-graphics application 30. However, any combination of shader cores is possible. For example, GPU driver 14 may reserve three of the four shader cores for graphics application 28, and the other shader core for non-graphics application 30. It may even be possible for GPU driver 14 to reserve all four shader cores for graphics application 28, and none for non-graphics application 30, or vice-versa.

GPU driver 14 may function as the interface between processor 12 and GPU 16 that allows processor 12 to control GPU 16. For example, when processor 12 needs to transmit a command to GPU 16, it is through GPU driver 14 that processor 12 transmits the command. The commands that processor 12 may transmit to GPU 16 include commands to load and execute instructions of graphics application 28 and non-graphics application 30, commands that indicate to GPU 16 where data is located in system memory 26, and to load such data, and other such commands. In this manner, processor 12 may control the functionality of GPU 16.

As illustrated, GPU driver 14 is shown in dashed lines within processor 12. This is to illustrate that GPU driver 14 is software that is executing on processor 12. In this example, system memory 26 stores the source code or object code of GPU driver 14 that processor 12 retrieves for execution. Alternatively, GPU driver 14 may be hardware embedded within processor 12, or hardware external to processor 12 that couples to processor 12 and GPU 16. In general, GPU driver 14 may be hardware, software, firmware, or any combination thereof. For purposes of illustration and clarity, the examples described in this disclosure are described in context of GPU driver 14 being software executing on processor 12.

GPU driver 14 may utilize various criteria to determine the number of shader cores that should be reserved for graphics application 28 and for non-graphics application 30. As one example, because processor 12 controls GPU 16, processor 12 may be knowledgeable as to how many instructions for graphics application 28 and how many instructions for non-graphics application 30 are currently queued up for execution by the shader cores of shader processor 22. In this example, GPU driver 14 may reserve the shader cores based on the number of instructions for graphics application 28 and non-graphics application 30 that are in the queue for execution by shader processor 22.

For example, if there are equal numbers of instructions that are queued for graphics application 28 and non-graphics application 30, GPU driver 14 may reserve an equal number of shader cores of shader processor 22 for each type of application. If there are more commands for non-graphics application 30 than for graphics application 28, GPU driver 14 may reserve more shader cores for non-graphics application 30 than for graphics application 28. If there are no instructions for non-graphics application 30 that are currently queued for execution, GPU driver 14 may reserve all shader cores for graphics application 28. In some examples, the number of shader cores reserved for each application may be proportional to the number of instructions that are queued for execution. However, other factors, such as execution time and priority, may also affect the number of shader cores reserved for each of the applications.

In some examples, GPU driver 14 may be biased towards graphics application 28. For example, an unresponsive graphics application may degrade user experience. To limit such degradation in user experience, GPU driver 14 may be configured to ensure that there are sufficient shader cores devoted to graphics application 28, even if that results in slight degradation in executing instructions of non-graphics application 30. In other words, from a user experience perspective, timely execution of graphics application 28 may be more valuable than timely execution of non-graphics application 30. To assist with better user experience, GPU driver 14 may be configured to sacrifice the timely execution of non-graphics application 30 to devote sufficient shader cores to graphics application 28.

For these cases, GPU driver 14 may assign the shader cores unequally. For instance, if there are equal number of instructions queued for graphics application 28 and non-graphics application 30, GPU driver 14 may reserve more shader cores for graphics application 28 than for non-graphics application 30. If there are twice as many instructions for non-graphics application 30 as there are for graphics application 28, GPU driver 14 may assign equal numbers of shader cores to each of graphics application 28 and non-graphics application 30.

In this manner, GPU driver 14 may determine how many shader cores are needed by graphics application 28 and how many shader cores are needed by non-graphics application 30 to provide a suitable user experience. To achieve such suitable user experience, GPU driver 14 may utilize certain criteria. For example, as discussed above, uninterrupted execution of graphics application 28 may be more important than slow or delayed execution of non-graphics application 30, and GPU driver 14 may be configured to ensure that sufficient shader cores are available for graphics application 28 even if that means that there will be fewer shader cores for non-graphics application 30.

In some examples, it may be possible to prioritize the execution of non-graphics application 30 over graphics application 28. For example, non-graphics application 30 may be an important application whose timely execution may be more valuable than potential minor degradation in graphics display. In this manner, the relative priorities of graphics application 28 and non-graphics application 30 may be configurable.

GPU driver 14, e.g., executed by processor 12, may utilize additional criteria in determining how many shader cores should be reserved for graphics application 28 and how many shader cores should be reserved for non-graphics application 30. For example, one or more tasks of graphics application 28 may complete in a relatively short period of time (e.g., a few milliseconds), while one or more tasks of non-graphics application 30 may complete in a relatively long period of time (e.g., a few seconds). As an illustrative example, GPU 16 may execute a plurality of graphics applications, one of which is graphics application 28, to generate a frame of a video game or a user interface screen. GPU 16 may also execute, as an example, non-graphics application 30 to stitch multiple camera pictures into a single panoramic image as one example, or provide decryption or decompression, as other examples.

In this situation, GPU 16 may need to generate frames at a 30 to 60 frames-per-second refresh rate to achieve smooth animation. Such a 30 to 60 frames-per-second refresh rate may require shader processor 22 to complete the execution of the tasks of graphics application 28 within a few milliseconds so that GPU 16 can achieve the 30 to 60 frames-per-second refresh rate. The execution of non-graphics application 30 may not require achieving smooth animation, or any animation for that matter. Therefore, it may be suitable for GPU 16 to complete the execution of non-graphics application 30 in more than few milliseconds. For instance, in this example, it may not be necessary for non-graphics application 30 to complete stitching of the camera pictures into a single panoramic image within a matter of few milliseconds, and it may be suitable for it to take 0.5 to 1 second to complete the stitching.

GPU driver 14 may utilize the criteria that, in general, graphics application 28 and non-graphics application 30 may require different amounts of time for completing tasks to determine the number of shader cores for graphics application 28 and non-graphics application 30. A task as used in this disclosure refers to subset of functions that are performed by graphics application 28 or non-graphics application 30. A task may be considered as a workgroup. For graphics application 28, there may be logical ways in which to delineate workgroups. For example, one workgroup may include all the functions needed to generate one frame for graphics application 28, or a tile in the frame. Because of this logical delineation of a workgroup, it may be easy to predict how long it will take shader processor 22 to complete a task for graphics application 28.

There may not be logical ways in which to delineate functions for non-graphics application 30, which may make it difficult to estimate an amount of time it takes shader processor 22 to complete a task for non-graphics application 30. By reserving shader cores of shader processor 22 for graphics application 28 and reserving shader cores of shader processor 22 for non-graphics application 30, the techniques may be able to minimize execution interference between graphics application 28 and non-graphics application 30 even where it may be difficult to predict how much time it will take non-graphics application 30 to complete tasks.

The techniques described in this disclosure may allow for efficient parallel execution of graphics application 28 and non-graphics application 30 without excessive access to system memory 26, and without requiring multiple GPUs. For example, GPU 16 may not need to stop executing non-graphics application 30 to execute graphics application 28. For example, shader cores of shader processor 22 dedicated to non-graphics applications operate only on the non-graphics applications while processor cores of shader processor 22 dedicated to graphics applications separately operate only on the graphics applications. Also, the technique may allow for both graphics application 28 and non-graphics application 30 to execute on a single GPU 16.

Some other techniques may stop the execution of non-graphics application 30 to allow the execution of graphics application 28. However, to stop the execution of non-graphics application 30, a GPU used in these other techniques may be required to store all state information of non-graphics application at the moment it is paused into system memory 26, and retrieve all the state information from system memory 26 when the execution non-graphics application 30 is resumed. This storage and retrieval of all state information may consume bus bandwidth and require a relatively large amount of power.

These other techniques that stop the execution of non-graphics application 30 and then later resume the execution may be considered as inter-leaving the execution of graphics application 28 and non-graphics application 30, rather than executing these applications at the same time. The efficient parallel execution (i.e., at the same time) of graphics application 28 and non-graphics application 30 at the same time, using different sets of processor cores of shader processor 22, as described in this disclosure, may not require inter-leaving the execution of these applications, thereby promoting efficient usage of bus bandwidth and power consumption.

In examples of some other additional techniques, the techniques timed how long a non-graphics application such as non-graphics application 30 would execute on the GPU. If the execution took longer than the threshold time, the GPU would stop executing non-graphics application 30 altogether. However, such techniques did not allow certain types of non-graphics applications to execute (e.g., ones that required more time than allotted to execute).

In yet some other techniques, a device would include two GPUs. One GPU would be reserved for graphics application 28, and the other would be reserved for non-graphics application 30. However, utilizing two graphics processing devices utilizes additional real-estate on the device, where such additional real-estate may not be available. Also, for a given moment, it may be possible that there is no graphics application that needs to be executed, but there is a non-graphics application that needs to be executed, or vice-versa. In either of these cases, one GPU remains idle while the other GPU remains active, which may be an inefficient usage of the GPUs.

Figure 2:
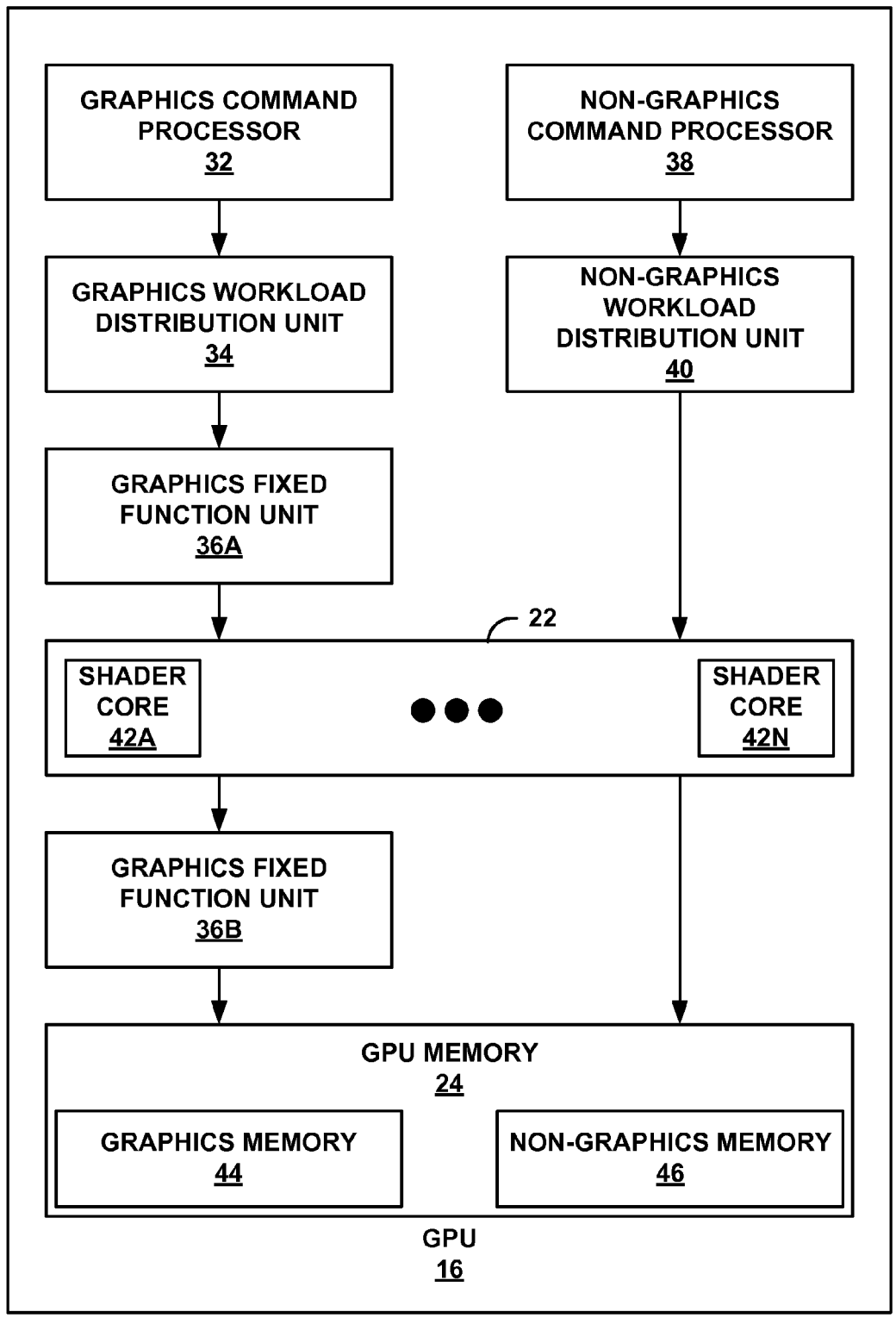
FIG. 2 is a block diagram illustrating an example of a graphics processing unit (GPU) of FIG. 1 in further detail.

FIG. 2 is a block diagram illustrating an example of the GPU of FIG. 1 in further detail. For example, FIG. 2 illustrates GPU 16 in further detail, where GPU 16 is an example of a general purpose GPU (GPGPU). As illustrated, in addition to shader processor 22 and GPU memory 24, GPU 16 may include graphics command processor 32, graphics workload distribution unit 34, graphics fixed function units 36A and 36B (collectively referred to as graphics fixed function units 36), non-graphics command processor 38, and non-graphics workload distribution unit 40. Shader processor 22 may include multiple shader cores 42A-42N (collectively referred to as shader cores 42). For example, shader processor 22 may include four shader cores 42, although more or fewer shader cores 42 is possible. In some examples, shader cores 42 may be referred to as shader/texture cores to indicate that texturing may also occur in such cores. However, to ease with understanding, shader cores 42 refer to shader cores or shader/texture cores.

GPU 16 may include additional components than those illustrated in FIG. 2. For example, as illustrated, non-graphics workload distribution unit 40 outputs directly to shader processor 22, and shader processor 22 outputs directly to GPU memory 24. In other examples, there may be one or more components between non-graphics workload distribution unit 40 and shader processor 22, and between shader processor 22 and GPU memory 24. Furthermore, the specific arrangement of the components within GPU 16 is also provided for purposes of illustration, and should not be considered limiting. In alternate examples, the components may be ordered in a manner different than that illustrated in FIG. 2.

In FIG. 2, graphics command processor 32, graphics workload distribution unit 34, graphics fixed function unit 36A, and graphics fixed function unit 36B may be part of graphics function pipelines 18A and 18B (FIG. 1). Also, non-graphics command processor 38 and non-graphics workload distribution unit 40 may be part of non-graphics function pipeline 20A (FIG. 1). GPU 16 may include components that would be part of non-graphics function pipeline 20B (FIG. 1) that are not illustrated in FIG. 2 for purposes of clarity. These various components of GPU 16 may be implemented as hardware, software executing on hardware, or a combination thereof. For purposes of illustration only and not as limitations, the components of GPU 16 are described as hardware units.

As illustrated, GPU 16 includes two command processors (i.e., graphics command processor 32 and non-graphics command processor 38). In alternate examples, it may be possible for GPU 16 to include a single command processor, as described in more detail with respect to FIG. 3. In the example of FIG. 2, graphics command processor 32 and non-graphics command processor 38 may be identical with one another. Graphics command processor 32 may operate on commands or instructions for graphics functions, and not for non-graphics functions. Non-graphics command processor 38 may operate on commands or instructions for non-graphics functions, and not for graphics functions. In this manner, GPU 16 may delineate between graphics and non-graphics commands and instructions, which may promote efficient parallel execution (e.g., at the same time) of both graphics and non-graphics applications on GPU 16.

For example, GPU driver 14, executing on processor 12, as illustrated in FIG. 1, may instruct graphics command processor 32 to retrieve instructions of graphics application 28 and data that is to be used by the instructions from system memory 26. GPU driver 14 may also transmit an indication to graphics command processor 32 that indicates the number of shader cores 42 reserved for graphics application 28 (e.g., a first set of shader cores 42 reserved for graphics application 28), and possibly which ones of shader cores 42 are reserved for graphics application 28. Similarly, GPU driver 14 may instruct non-graphics command processor 38 to retrieve instructions of non-graphics application 30 and data that is to be used by the instructions from system memory 26. GPU driver 14 may also transmit an indication to non-graphics command processor 38 that indicates the number of shader cores 42 reserved for non-graphics application 30 (e.g., a second set of one or more shader cores 42 reserved for non-graphics application 30), and possibly which ones of shader core 42 are reserved for non-graphics application 30.

GPU 16 including both a graphics command processor 32 and a non-graphics command processor 38 may increase the overall size of GPU 16, as compared to other GPUs that include a single command processor. However, the increase in size due to the inclusion of an additional command processor may be fairly minimal. In most cases, the increase in size due to the inclusion of the additional command processor may be far less than using two separate graphics processing devices, as described above.

Furthermore, the inclusion of an additional command processor may cause GPU 16 to use additional power, as compared to GPUs that include a single command processor. However, the techniques described in this disclosure may minimize the use of additional power. For example, as described above, GPU driver 14 may be configured to determine whether there are instructions or commands for non-graphics application 30 and graphics application 28. If there are no instructions for non-graphics application 30, GPU driver 14 may instruct non-graphics command processor 38 to power down. GPU driver 14 may then instruct to power up command processor 38 when needed.

Graphics workload distribution unit 34 and non-graphics workload distribution unit 40 determine how to distribute the workload to respective reserved shader cores 42. For example, graphics workload distribution unit 34 may receive an indication of which ones of shader cores 42 are reserved for graphics application 28 from graphics command processor 32. Graphics workload distribution unit 34 may determine how the instructions that graphics command processor 32 retrieved from system memory 26 should be divided among the shader cores 42 reserved for graphics application 28. Non-graphics workload distribution unit 40 may receive an indication of which ones of shader cores 42 are reserved for non-graphics application 30 from non-graphics command processor 38. Non-graphics workload distribution unit 40 may determine how the instructions that non-graphics command processor 38 retrieved from system memory 26 should be divided among the shader cores 42 reserved for non-graphics application 30.

Graphics fixed function units 36 may be hardwired fixed function logic units that perform specific graphics functions. For example, while graphics application 28 executing on reserved shader cores 42 of shader processor 22 may allow for functional flexibility, graphics fixed function units 36 may provide minimal, if any functional flexibility. Each one of graphics fixed function units 36 may include various hardwired units such as a primitive assembly unit, a frustum unit, a perspective divide unit, a viewport transformation unit, a depth testing unit, a rasterization unit, a per-fragment operation unit, and an alpha blending unit. These units of fixed function units 36, which may form part of graphics function pipeline 18A, are provided for illustration purposes, and should not be considered limiting. Moreover, some of these units may reside in graphics fixed function units 36A, while the others may reside in graphics fixed function units 36B. The specific ordering of these units may be different in different examples as well.

In FIG. 2, graphics fixed function unit 36B and shader processor 22 may output to GPU memory 24. GPU memory 24 may be cache memory such as a multi-stage specialized cache including a color buffer cache or a general purpose cache (e.g., address-based), or any combination thereof. In some examples, GPU memory 24 may be split into two areas (i.e., graphics memory 44 and non-graphics memory 46). In this example, graphics memory 44 may be reserved for graphics functions, and non-graphics memory 46 may be reserved for non-graphics functions.

GPU memory 24 may prioritize storage space for graphics memory 44 over non-graphics memory 46. As one example, at least one of graphics command processor 32 and non-graphics command processor 38 may instruct GPU memory 24 to prioritize the storage graphics data over non-graphics data. In other words, the storage for graphics functions (e.g., instructions or commands, data to be used by the instructions or commands, and the resulting data) may be prioritized over the storage for non-graphics functions. In this example, data for non-graphics functions may then be stored in system memory 26, rather than locally within GPU memory 24. Also, in instances where a cache miss occurs, requests for graphics application 28, and graphics functions in general, may be given priority over non-graphics application 30 and non-graphics functions in general for access to system memory 26, e.g., via a system bus. Such priority in memory storage and retrieval may further ensure that the graphics applications are executed in a timely fashion to minimize degradation in the user-experience.

Figure 3:
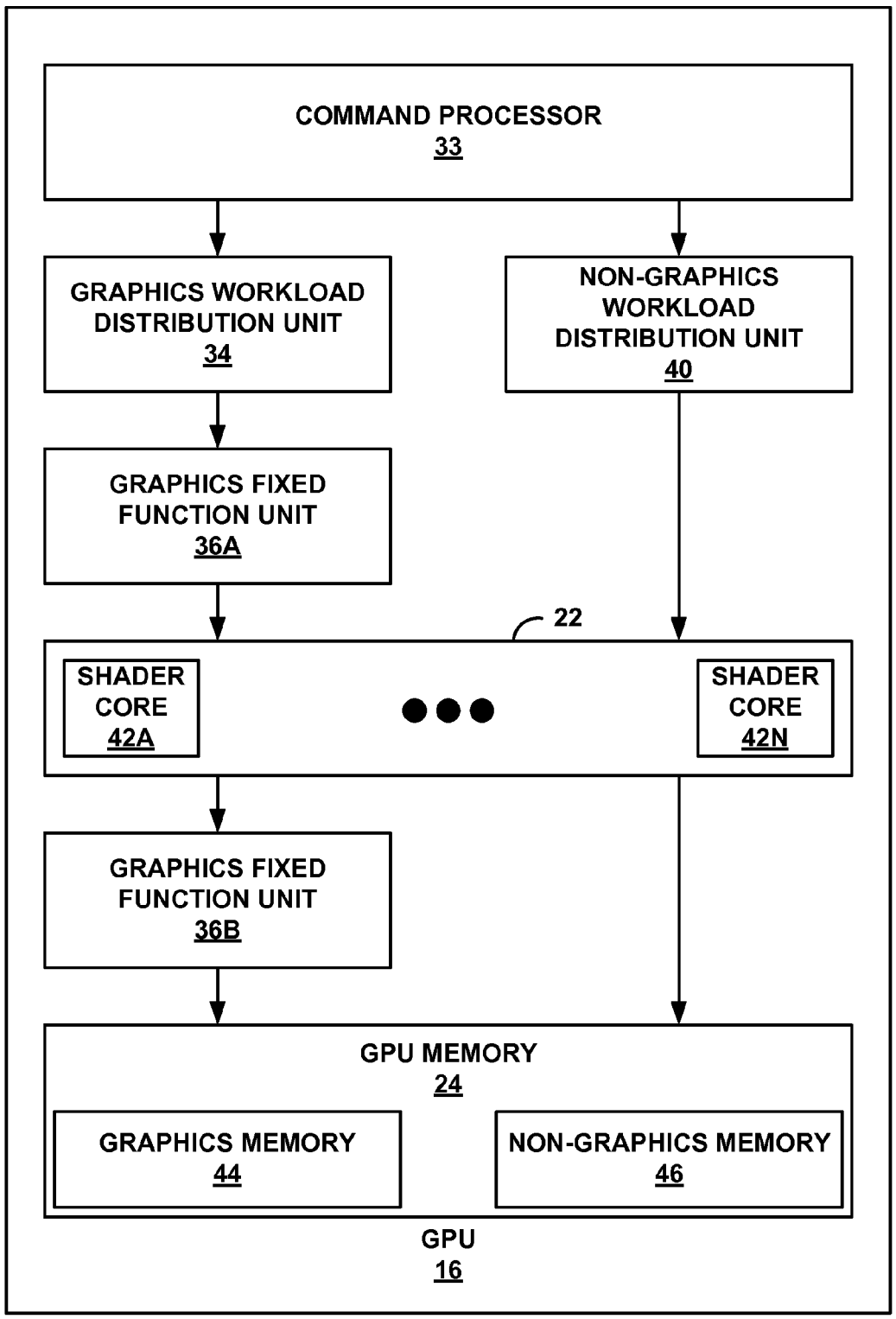
FIG. 3 is a block diagram illustrating another example of the GPU of FIG. 1 in further detail.

FIG. 3 is a block diagram illustrating another example of the GPU of FIG. 1 in further detail. GPU 16 as illustrated in FIG. 3 may be substantially similar to GPU 16 as illustrated in FIG. 2. Accordingly, for purposes of brevity only those units that are different are described in detail. Units illustrated in FIG. 3 with the same reference numeral as units illustrated in FIG. 2 may function in a substantially similar manner.

In the example of FIG. 3, GPU 16 may include a single command processor 33, rather than two distinct command processors (e.g., graphics command processor 32 and non-graphics command processor 38 of FIG. 2). In this example, command processor 33 may be configured to process two or more streams of commands in parallel (i.e., at the same time). For example, GPU driver 14 may transmit similar instructions to command processor 33 as the instructions that GPU driver 14 transmitted to graphics command processor 32 and non-graphics command processor 38.

As one example, GPU driver 14 may instruct command processor 33 to retrieve instructions of graphics application 28 from system memory 26, retrieve data that is be used by the instructions from system memory 26, indicate the number of shader cores 42 reserved for graphics application 28, and possibly indicate which ones of the shaders cores 42 are reserved for graphics application 28. At the same or overlapping time as when command processor 33 receives instructions for graphics application 28, command processor 33 may receive instructions from GPU driver 14 that instruct command processor 33 to retrieve instructions of non-graphics application 30 from system memory 26, retrieve data that is to be used by the instructions from system memory 26, indicate the number of shader cores 42 reserved for non-graphics application 30, and possibly indicate which ones of shader core 42 are reserved for non-graphics application 30.

In this example, command processor 33 may be configured to delineate between which instructions are for graphics functions and which instructions are for non-graphics functions. For example, GPU driver 14 may indicate whether the instructions that GPU driver 14 transmits to command processor 33 are for graphics functions or non-graphics functions. In general, GPU driver 14 and command processor 33 may utilize any technique to delineate instructions for graphics functions such as instructions of graphics application 28, and instructions for non-graphics functions such as instructions of non-graphics application 30.

In other examples of GPUs that includes a single command processor, such a command processor may not have been able to receive multiple instruction streams from the processor at the same or overlapping time. Command processor 33 may GPU 16 to process instructions for graphics application 28 and non-graphics application 30 at the same time. In some instances, if there are no instructions for graphics application 28, or graphics application 28 is idle, command processor 33 may still receive the instructions for non-graphics application 30 for execution. Similarly, if there are no instructions for non-graphics application 30, or graphics application 30 is idle, command processor 33 may still receive the instructions for graphics application 28 for execution.

Figure 4:
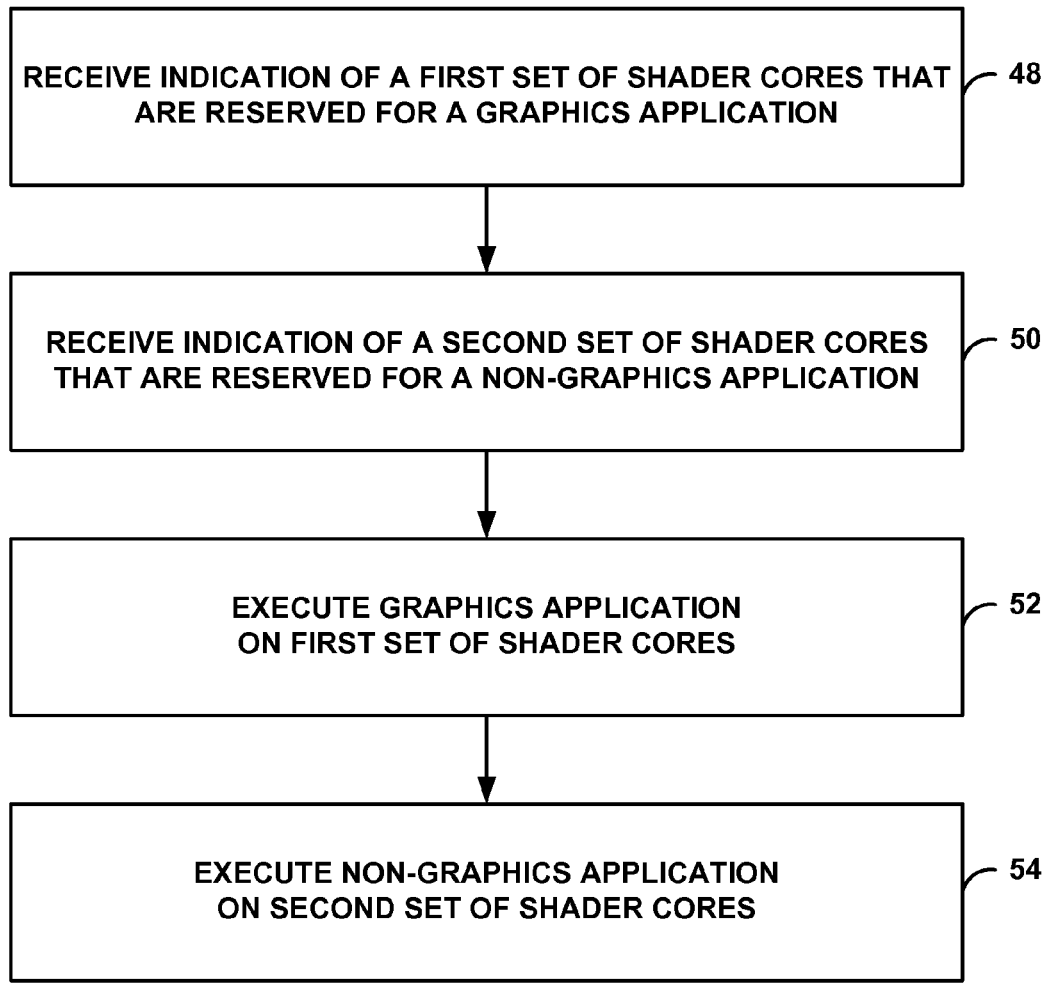
FIG. 4 is a flowchart illustrating an example technique in accordance with one or more examples described in this disclosure.

FIG. 4 is a flowchart illustrating an example technique in accordance with one or more examples described in this disclosure. For purposes of illustration only and to ease with understanding, reference is made to FIGS. 1-3.

A GPU may receive an indication of a first set of one or more shader cores of a shader processor of the GPU that are reserved for a graphics application (48). The GPU may also receive an indication of a second, different set of one or more shader cores of the shader processor that are reserved for a non-graphics application (50). As one example, a first command processor (e.g., graphics command processor 32) of GPU 16 may receive an indication from GPU driver 14 of a first set of shader cores from shader cores 42 that are reserved for graphics application 28. In this example, a second, different command processor (e.g., non-graphics command processor 38) of GPU 16 may receive an indication from GPU driver 14 of a second, different set of shader cores from shader cores 42 that are reserved for non-graphics application 30. In an alternate example, the first and second command processors may be a same command processor. For example, in this alternate example, command processor 33 may receive an indication from GPU driver 14 of a first set of shader cores reserved for graphics application 28, and an indication of a second, different set of shader cores reserved for non-graphics application 30.

In either of these examples, the indication of the first set of shader cores and the indication of the second, different set of shader cores may include an indication that indicates how many of shader cores 42 are reserved for graphics application 28, and how many of shader cores 42 are reserved for non-graphics application 30. In some examples, the indication of the first set of shader cores and the indication of the second, different set of shader cores may also include an indication of which ones of shader cores 42 are reserved for graphics application 28, and which ones of shader cores 42 are reserved for non-graphics application 30.

The first set of the shader cores (e.g., one or more shader cores 42) may execute instructions of the graphics application such as graphics application 28 (52). For example, graphics command processor 32 or command processor 33 may receive instructions of graphics application 28 for execution, and cause the first set of shader cores to execute the instructions of graphics application 28. In this example, the first set of the shader cores may not execute instructions of non-graphics application 30. In some examples, a first workload distribution unit (e.g., graphics workload distribution unit 34) may determine which ones of the first set of shader cores execute which ones of the instructions of the graphics application 28. In this example, the first set of shader cores may execute the instructions determined by graphics workload distribution unit 34.

A second set of the shader cores (e.g., one or more of the remaining shader cores 42) may execute instruction of the non-graphics application 30 (54). For example, non-graphics command processor 38 or command processor 33 may receive instructions of non-graphics application 30 for execution, and cause the second set of shader cores to execute the instructions of non-graphics application 30. In this example, the second set of the shader cores may not execute instructions of graphics application 28. In some examples, a second workload distribution unit (e.g., non-graphics workload distribution unit 40) may determine which ones of the second set of shader cores execute which ones of the instructions of the non-graphics application 30. In this example, the second set of shader cores may execute the instructions determined by non-graphics workload distribution unit 40.

In some examples, at a same time as when the first set of shader cores are executing the instructions of graphics application 28, the second set of shader cores may be executing the instructions of non-graphics application 30 to allow for parallel execution of graphics application 28 and non-graphics application 30. In some examples, at a same time as when GPU 16, via graphics command processor 32 or command processor 33, is receiving the instructions for graphics application 28, GPU 16, via non-graphics command processor 38 or command processor 33, is receiving the instructions for non-graphics application 30.

Figure 5:
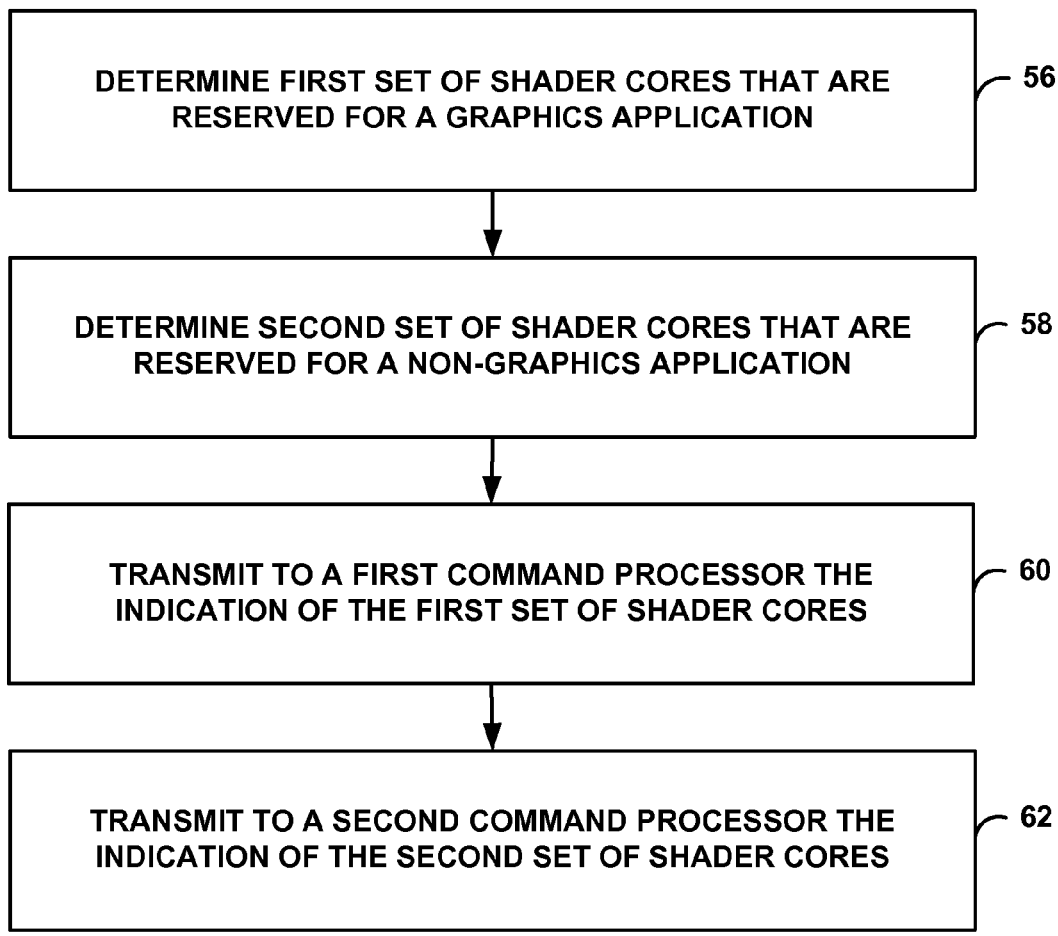
FIG. 5 is a flowchart illustrating another example technique in accordance with one or more examples described in this disclosure.

FIG. 5 is a flowchart illustrating another example technique in accordance with one or more examples described in this disclosure. For purposes of illustration only and to ease with understanding, reference is made to FIGS. 1-3.

A driver on a processor may determine a first set of shader cores of a shader processor of a GPU that are reserved for a graphics application to be executed on the first set of shader cores (56). For example, GPU driver 14, which may be executing on processor 12, may determine how many and which ones of shader cores 42 of shader processor 22 of GPU 16 are reserved for graphics application 28 for executing graphics application 28.

The driver on the processor may determine a second, different set of shader cores of the shader processor of the GPU that are reserved for a non-graphics application to be executed on the second set of shader cores (58). For example, GPU driver 14 may determine how many and which ones of shader cores 42 of shader processor 22 of GPU 16 are reserved for non-graphics application 30 for executing non-graphics application 30.

In some examples, GPU driver 14 may determine that the first set of shader cores (i.e., the ones reserved for graphics application 28) include more shader cores than the second set of shader cores (i.e., the ones reserved for non-graphics application 30). To make the determination of how many shader cores should be reserved for graphics application 28, GPU driver 14 may determine a number of instructions of graphics application 28 that are currently queued. Similarly, to make the determination of how many shader cores should be reserved for non-graphics application 30, GPU driver 14 may determine a number of instructions of non-graphics application 30 that are currently queued.

The driver may transmit to a first command processor within the GPU an indication of the first set of shader cores (60). The driver may also transmit to a second command processor within the GPU an indication of the second set of shader cores (62). The GPU may then execute graphics application 28 on the first set of shader cores, and execute non-graphics application 30 on the second set of shader cores. In some examples, the first and second command processors may be different command processors. In alternate examples, the first and second command may be a same command processor. For instance, GPU driver 14 may transmit an indication to graphics command processor 32 that indicates how many and which ones of shader cores 42 are reserved for graphics application 28, and transmit an indication to non-graphics command processor 38 that indicates how many and which ones of shader cores 42 are reserved for non-graphics application 30, in examples where the first and second command processors are different command processors. In another example, GPU driver 14 may transmit an indication to command processor 33 that indicates how many and which ones of shader cores 42 are reserved for graphics application 28, and transmit an indication to command processor 33 that indicates how many and which ones of shader cores 42 are reserved for non-graphics application 30, in instances where the first and second command processors are a same command processor.

Figure 6:
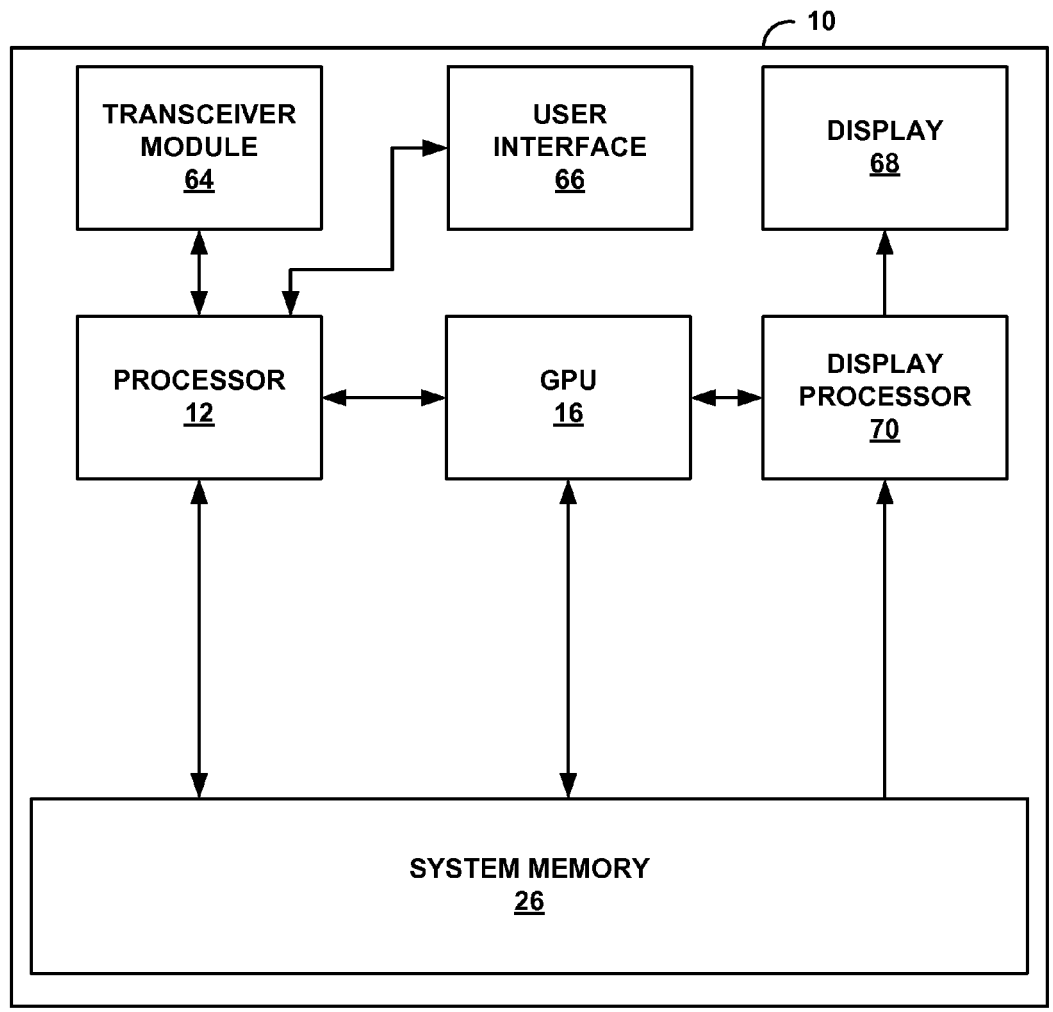
FIG. 6 is a block diagram illustrating an example device, illustrated in FIG. 1, in further detail.

FIG. 6 is a block diagram illustrating an example device, illustrated in FIG. 1, in further detail. For example, FIG. 6 illustrates device 10 of FIG. 1 in greater detail. For purposes of brevity, only the components of device 10 that are illustrated in FIG. 6, but not illustrated in FIG. 1 are described in detail.

In the example of FIG. 6, device 10 may include processor 12, GPU 16, memory 26, transceiver module 64, user interface 66, display 68, and display processor 70. Device 10 may include additional modules or units not shown in FIG. 6 for purposes of clarity. For example, device 10 may include a speaker and a microphone, neither of which are shown in FIG. 6, to effectuate telephonic communications in examples where device 10 is a mobile wireless telephone, or a speaker where device 10 is a media player. Device 10 may also include a video camera. Furthermore, the various modules and units shown in device 10 may not be necessary in every example of device 10. For example, user interface 66 and display 68 may be external to device 10 in examples where device 10 is a desktop computer or other device that is equipped to interface with an external user interface or display.

Examples of user interface 66 include, but are not limited to, a trackball, a mouse, a keyboard, and other types of input devices. User interface 66 may also be a touch screen and may be incorporated as a part of display 68. Transceiver module 64 may include circuitry to allow wireless or wired communication between device 10 and another device or a network. Transceiver module 64 may include modulators, demodulators, amplifiers and other such circuitry for wired or wireless communication. Display 68 may comprise a liquid crystal display (LCD), an organic light emitting diode display (OLED), a cathode ray tube (CRT) display, a plasma display, or another type of display device.

In some examples, after GPU 16 generates the graphics data for display on display 68, GPU 16 may output the resulting graphics data to system memory 26 for temporary storage. Display processor 70 may retrieve the graphics data from system memory 26, perform any post-processing on the graphics data, and output the resulting the graphics data to display 68. For example, display processor 70 may perform any further enhancements or scale the graphics data generated by GPU 16. In other examples, it may be possible for GPU 16 to output graphics data to a frame buffer within system memory 26 that then outputs the graphics data to display 68. In this example, display processor 70 may not be necessary.

In the example of FIG. 6, processor 12 and GPU 16 may be configured as described above with respect to FIGS. 1-5. For example, GPU 16 may include a shader processor that includes a plurality of shader cores. Processor 12 may reserve a first set of the plurality of shader cores for GPU 16 to execute a graphics application, and reserve a second set of the plurality of shader cores for GPU 16 to execute a non-graphics application. In this example, and as described above, the shader cores reserved for graphics applications may not execute instructions for non-graphics applications, and vice-versa.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
receiving, with a graphics processing unit (GPU), an indication of a first set of shader cores of a shader processor of the GPU that are reserved for executing instructions of a graphics application;
receiving, with the GPU, an indication of a second, different set of shader cores of the same shader processor of the same GPU that are reserved for executing instructions of a non-graphics application;
receiving, with the GPU, the instructions of the graphics application;
receiving, with the GPU, the instructions of the non-graphics application;
determining, with a first workload distribution unit of the GPU, which ones of the first set of shader cores execute which ones of the instructions of the graphics application;
determining, with a second, different workload distribution unit of the GPU, which ones of the second set of shader cores execute which ones of the instructions of the non-graphics application;
executing, with the GPU, all of the instructions of the graphics application with the first set of shader cores, and no other shader cores, based on the determination of which ones of the first set of shader cores execute which ones of the instructions of the graphics application; and
at a substantially same time as executing the instructions of the graphics application, executing, with the GPU, all of the instructions of the non-graphics application with the second set of shader cores, and no other shader cores, based on the determination of which ones of the second set of shader cores execute which ones of the instructions of the non-graphics application and without inter-leaving the execution of the non-graphics application and the execution of the graphics application.

2. The method of claim 1, wherein receiving the indication of the first set of shader cores comprises receiving, with a first command processor of the GPU, the indication of the first set of shader cores, and wherein receiving the indication of the second set of shader cores comprises receiving, with a second, different command processor of the GPU, the indication of the second set of shader cores.

3. The method of claim 1, wherein receiving the indication of the first set of shader cores comprises receiving, with a command processor of the GPU, the indication of the first set of shader cores, and wherein receiving the indication of the second set of shader cores comprises receiving with the same command processor, the indication of the second set of shader cores.

4. The method of claim 1, wherein receiving instructions of the non-graphics application comprises receiving the instructions of the non-graphics application at a same time as receiving instructions of the graphics application.

5. The method of claim 1, further comprising:
prioritizing storing of results of the execution of the instructions of the graphics application in a memory cache within the GPU over storing results of the execution of the instructions of the non-graphics application in the memory cache within the GPU.

6. The method of claim 1, wherein receiving the indication of the first set of shader cores comprises receiving, with a first command processor of the GPU, the indication of the first set of shader cores, and wherein receiving the indication of the second set of shader cores comprises receiving, with a second, different command processor of the GPU, the indication of the second set of shader cores, the method further comprising:
receiving an indication to power down the second command processor when there are no instructions of the non-graphics application; and
powering down the second command processor in response to receiving the indication.

7. The method of claim 1, wherein a number of shader cores of the first set of shader cores is different than a number of shader cores of the second set of shader cores.

8. A method comprising:
determining, with a driver on a processor, how many and which ones of shader cores of a shader processor of a graphics processing unit (GPU) are reserved for a graphics application, wherein the determined shader cores that are reserved for the graphics application comprise a first set of shader cores, and wherein all instructions of the graphics application are to be executed on the first set of shader cores;
determining, with the driver on the processor, how many and which ones of the shader cores of the same shader processor of the same GPU are reserved for a non-graphics application, wherein the determined shader cores that are reserved for the non-graphics application comprise a second, different set of shader cores, and wherein all instructions of the non-graphics application are to be executed by the second set of shader cores; and
transmitting to the GPU an indication of the first set of shader cores and an indication of the second set of shader cores to allow the GPU to execute instructions of the graphics application and instructions of the non-graphics application at a substantially same time without inter-leaving the execution of the graphics application and the non-graphics application.

9. The method of claim 8, further comprising:
determining that the first set of shader cores include more shader cores than the second set of shader cores so that more shader cores are available for executing the graphics application.

10. The method of claim 8, wherein determining the first set of shader cores comprises determining the first set of shader cores based on a number of queued instructions of the graphics applications.

11. The method of claim 8, wherein determining the second set of shader cores comprises determining the second set of shader cores based on a number of queued instructions of the non-graphics applications.

12. The method of claim 8, wherein transmitting comprises:
transmitting to a first command processor within the GPU the indication of the first set of shader cores; and
transmitting to a second, different processor within the GPU the indication of the second set of shader cores.

13. The method of claim 8, wherein transmitting comprises:
    transmitting to a command processor within the GPU the indication of the first set of shader cores; and
    transmitting to the same command processor within the GPU the indication of the second set of shader cores.

14. A graphics processing unit (GPU) comprising:
    a shader processor that includes a plurality of shader cores;
    a first command processor configured to receive an indication of a first set of the shader cores of the shader processor that are reserved for executing instructions of a graphics application, and receive the instructions of the graphics application;
    a second command processor configured to receive an indication of a second, different set of the shader cores of the same shader processor that are reserved for executing instructions of a non-graphics application, and receive the instructions of the non-graphics application;
    a first workload distribution unit configured to determine which ones of the first set of the shader cores execute which ones of the instructions of the graphics application; and
    a second, different workload distribution unit configured to determine which ones of the second set of the shader cores execute which ones of the instructions of the non-graphics application,
    wherein the first set of the shader cores, and no other shader cores, are configured to execute all of the instructions of the graphics application based on the determination of the first workload distribution unit of which ones of the first set of shader cores execute which ones of the instructions of the graphics application, and
    wherein the second set of the shader cores, and no other shader cores, are configured to execute, at substantially a same time as the execution of the instructions of the graphics application, all of the instructions of the non-graphics application based on the determination of the second workload distribution unit of which ones of the second set of shader cores execute which ones of the instructions of the non-graphics application and without inter-leaving the execution of the non-graphics application and the execution of the graphics application.

15. The GPU of claim 14, wherein the first command processor is different than the second command processor.

16. The GPU of claim 14, wherein the first command processor is the same as the second command processor.

17. The GPU of claim 14, wherein the first command processor is configured to receive the instructions of the graphics application at a same time as the second command processor receiving the instructions of the non-graphics application.

18. The GPU of claim 14, further comprising:
    a memory cache,
    wherein at least one of the first command processor and the second command processor is configured to prioritize storage of results of the execution of the instructions of the graphics application in the memory cache over storage of results of the execution of the instructions of the non-graphics application in the memory cache.

19. The GPU of claim 14, wherein the GPU is configured to receive an indication to power down the second command processor when there are no instructions of the non-graphics application, and power down the second command processor in response to the reception of the indication to power down.

20. The GPU of claim 14, wherein a number of shader cores of the first set of the shader cores is different than a number of shader cores of the second set of the shader cores.

21. A processor configured to:
    determine how many and which ones of shader cores of a shader processor of a graphics processing unit (GPU) are reserved for a graphics application, wherein the determined shader cores that are reserved for the graphics application comprise a first set of shader cores, and wherein all instructions of the graphics application are to be executed on the first set of the shader cores;
    determine how many and which ones of the shader cores of the same shader processor of the same GPU are reserved for a non-graphics application, wherein the determined shader cores that are reserved for the non-graphics application comprise a second, different set of shader cores, and wherein all instructions of the non-graphics application are to be executed by the second set of shader cores; and
    transmit to the GPU an indication of the first set of shader cores and an indication of the second set of shader cores to allow the GPU to execute instructions of the graphics application and instructions of the non-graphics application at a substantially same time without inter-leaving the execution of the graphics application and the non-graphics application.

22. The processor of claim 21, wherein the processor executes a driver that performs the determinations and the transmission to the GPU.

23. The processor of claim 21, wherein the processor is configured to determine that the first set of shader cores includes more shader cores than the second set of shader cores so that more shader cores are available for executing the graphics application.

24. The processor of claim 21, wherein the processor is configured to determine the first set of shader cores based on a number of queued instructions of the graphics application.

25. The processor of claim 21, wherein the processor is configured to determine the second set of shader cores based on a number of queued instructions of the non-graphics application.

26. The processor of claim 21, wherein the processor is configured to:
    transmit to a first command processor of the GPU the indication of the first set of the shader cores; and
    transmit to a second, different command processor of the GPU the indication of the second set of the shader cores.

27. The processor of claim 21, wherein the processor is configured to:
    transmit to a command processor of the GPU the indication of the first set of the shader cores; and
    transmit to the same command processor of the GPU the indication of the second set of the shader cores.

28. A graphics processing unit (GPU) comprising:
    first means for receiving an indication of a first set of shader cores of a shader processor of the GPU that are reserved for executing instructions of a graphics application;
    second means for receiving an indication of a second, different set of shader cores of the same shader processor of the same GPU that are reserved for executing instructions of a non-graphics application;
    third means for receiving the instructions of the graphics application;
    fourth means for receiving the instructions of the non-graphics application;
    means for determining which ones of the first set of shader cores execute which ones of the instructions of the graphics application;

means for determining which ones of the second set of shader cores execute which ones of the instructions of the non-graphics application;

means for executing all of the instructions of the graphics application with the first set of shader cores, and no other shader cores, based on the determination of which ones of the first set of shader cores execute which ones of the instructions of the graphics application; and at a same time as executing the instructions of the graphics application, means for executing all of the instructions of the non-graphics application with the second set of shader cores, and no other shader cores, based on the determination of which ones of the second set of shader cores execute which ones of the instructions of the non-graphics application and without inter-leaving the execution of the non-graphics application and the execution of the graphics application.

29. The GPU of claim 28, wherein the first means for receiving and the second means for receiving comprise different means for receiving.

30. A non-transitory computer-readable storage medium comprising instructions that cause a graphics processing unit (GPU) to:

receive, with the GPU, an indication of a first set of shader cores of a shader processor of the GPU that are reserved for executing instructions of a graphics application;

receive, with the GPU, an indication of a second, different set of shader cores of the same shader processor of the same GPU that are reserved for executing instructions of a non-graphics application;

receive, with the GPU, the instructions of the graphics application;

receive, with the GPU, the instructions of the non-graphics application;

determine, with a first workload distribution unit of the GPU, which ones of the first set of shader cores execute which ones of the instructions of the graphics application;

determine, with a second, different workload distribution unit of the GPU, which ones of the second set of shader cores execute which ones of the instructions of the non-graphics application;

execute, with the GPU, all of the instructions of the graphics application with the first set of shader cores, and no other shader cores, based on the determination of which ones of the first set of shader cores execute which ones of the instructions of the graphics application; and at a same time as executing the instructions of the graphics application, execute, with the GPU, all of the instructions of the non-graphics application with the second set of shader cores, and no other shader cores, based on the determination of which ones of the second set of shader cores execute which ones of the instructions of the non-graphics application and without inter-leaving the execution of the non-graphics application and the execution of the graphics application.

31. The non-transitory computer-readable storage medium of claim 30, wherein the instructions to receive the indication of the first set of shader cores comprise instructions to receive the indication of the first set of shader cores with a first command processor, and wherein the instructions to receive the indication of the second set of shader cores comprises instructions to receive the indication of the second set of shader cores with a second, different command processor.

32. A processor comprising:

means for determining how many and which ones of shader cores of a shader processor of a graphics processing unit (GPU) are reserved for a graphics application, wherein the determined shader cores that are reserved for the graphics application comprise a first set of shader cores, and wherein all instructions of the graphics application are to be executed on the first set of shader cores;

means for determining how many and which ones of the shader cores of the same shader processor of the same GPU are reserved for a non-graphics application, wherein the determined shader cores that are reserved for the non-graphics application comprise a second, different set of shader cores, and wherein all instructions of the non-graphics application are to be executed by the second set of shader cores; and means for transmitting to the GPU an indication of the first set of shader cores and an indication of the second set of shader cores to allow the GPU to execute instructions of the graphics application and instructions of the non-graphics application at a substantially same time without inter-leaving the execution of the graphics application and the non-graphics application.

33. A non-transitory computer-readable storage medium comprising instructions that cause one or more processors to:

determine, with a driver on the one or more processors, how many and which ones of shader cores of a shader processor of a graphics processing unit (GPU) are reserved for a graphics application, wherein the determined shader cores that are reserved for the graphics application comprise a first set of shader cores, and wherein all instructions of the graphics application are to be executed on the first set of shader cores;

determine, with the driver on the one or more processors, how many and which ones of the shader cores of the same shader processor of the same GPU are reserved for a non-graphics application, wherein the determined shader cores that are reserved for the non-graphics application comprise a second, different set of shader cores, and wherein all instructions of the non-graphics application are to be executed by the second set of shader cores; and transmit to the GPU an indication of the first set of shader cores and an indication of the second set of shader cores to allow the GPU to execute instructions of the graphics application and instructions of the non-graphics application at a substantially same time without inter-leaving the execution of the graphics application and the non-graphics application.

34. An apparatus comprising:

a processor; and a graphics processing unit (GPU), wherein the processor is configured to:

determine a first set of shader cores of a shader processor of the GPU that are reserved for a graphics application to be executed on the first set of the shader cores;

determine a second, different set of shader cores of the same shader processor of the same GPU that are reserved for a non-graphics application to be executed by the second set of shader cores; and transmit to the GPU an indication of the first set of shader cores and an indication of the second set of shader cores to allow the GPU to execute instructions of the graphics application and instructions of the non-graphics application at a substantially same time without interference with one another, wherein the GPU comprises:

the shader processor that includes a plurality of that shader cores that include the first set of shader cores and the second set of shader cores;

a first command processor configured to receive the indication of the first set of the shader cores that are reserved for executing instructions of the graphics application, and receive the instructions of the graphics application;

a second command processor configured to receive the indication of the second, different set of the shader cores that are reserved for executing instructions of the non-graphics application, and receive the instructions of the non-graphics application;

a first workload distribution unit configured to determine which ones of the first set of the shader cores execute which ones of the instructions of the graphics application; and a second, different workload distribution unit configured to determine which ones of the second set of the shader cores execute which ones of the instructions of the non-graphics application, wherein the first set of the shader cores, and no other shader cores, are configured to execute all of the instructions of the graphics application based on the determination of the first workload distribution unit of which ones of the first set of shader cores execute which ones of the instructions of the graphics application, and wherein the second set of the shader cores, and no other shader cores, are configured to execute, at substantially a same time as the execution of the instructions of the graphics application, all of the instructions of the non-graphics application based on the determination of the second workload distribution unit of which ones of the second set of shader cores execute which ones of the instructions of the non-graphics application and without inter-leaving the execution of the non-graphics application and the execution of the graphics application.

* * * * *